Patented Oct. 11, 1932

1,881,752

UNITED STATES PATENT OFFICE

FRANK LODGE AND WILLIAM WYNDHAM TATUM, OF MANCHESTER, ENGLAND, ASSIGNORS TO IMPERIAL CHEMICAL INDUSTRIES LIMITED, OF LONDON, ENGLAND

MANUFACTURE OF ANTHRAQUINONE DERIVATIVES

No Drawing. Application filed August 9, 1929, Serial No. 384,796, and in Great Britain September 18, 1928.

The 2-alkoxy derivatives of 1:4-diaminoanthraquinone are important intermediates for the manufacture of dyes. Amino and diaminoanthraquinones are not usually used as dyes but in British Patent No. 211,720 certain aminoanthraquinones and derivatives of the same are used to dye acetyl silks. The dyes used in the process of the patent are all insoluble in water and only very sparingly, if at all, even in strong acid solutions. When these dyes are applied to silk they must first be made into a colloidal solution or suspension.

We have found that 2-alkoxy derivatives of 1:4-diaminoanthraquinones including in this term the alkyl and aryl N-substituted derivatives of the same may be obtained with unexpected ease from 1:4-diaminoanthraquinones which contain a sulphonic group in position 2 by treatment with alkali metal alkoxides. Under alkali metal alkoxides we understand the bodies which result when alkali metal is caused to react with an aliphatic alcohol or when an aliphatic alcohol is treated with a concentrated aqueous lye of an alkali metal hydroxide or when a solid alkali metal hydroxide is dissolved in an aliphatic alcohol.

Our invention is applicable not only to 1:4-diaminoanthraquinone-2-sulphonic acid itself, but to derivatives thereof in which a hydrogen atom of the amino group is substituted by a hydrocarbon group or other group such as a sulphonated hydrocarbon group not removed by the alkali treatment. The alkoxide used may be derived from any of the lower aliphatic alcohols, such as methyl, ethyl, propyl, isopropyl, butyl, isobutyl, tertiary butyl, or any of the amyl alcohols; and any of those alcohols may be used with sodium or potassium hydroxide to effect the reaction.

Of the dyestuffs obtained according to the process of the present invention the majority are new and such new dyestuffs may be represented by the general formula

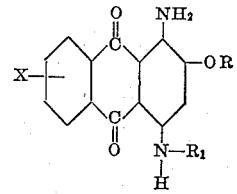

in which R represents an alkyl radical, $R_1$ represents hydrogen, alkyl group or aryl group, and X represents hydrogen or a sulphonic group.

Our invention is illustrated but not limited by the following examples:

*Example 1.—Preparation of 1-amino-2-methoxy-4-anilino-anthraquinone*

10 parts of 1-amino-4-anilino-anthraquinone-2-sulphonic acid are boiled with 100 parts of methyl alcohol and 20 parts of sodium methylate. After a short time the new compound is precipitated and is filtered off and washed with hot water. It forms a blue paste which dyes acetate rayon in violet shades. The colour in sulphuric acid is red, turning blue on addition of formaldehyde.

As an alternative method there may be used the following:

10 parts of 1-amino-4-anilino anthraquinone-2-sulphonic acid are boiled for four hours with 200 parts of methyl alcohol and 60 parts of caustic soda liquor 78° Tw. The product is worked up as above.

*Example 2.—1:4-diamino-2-methoxy anthraquinone*

10 parts of 1:4-diaminoanthraquinone-2-sulphonic acid are boiled under reflux with 50 parts of methyl alcohol and 20 parts of caustic soda liquor for about 18 hours. The base is filtered off, washed and pasted by solution in sulphuric acid and reprecipitated with water. It dyes acetate rayon in bright bluish red shades.

Example 3

10 parts of 1-amino-2-sulpho-4-(-sulpho-p-toluido)-anthraquinone are refluxed with 50 parts of methyl alcohol and 9 parts of caustic soda for four hours. The new dyestuff is filtered off and washed with 2% brine. It dyes wool in level violet shades which are fast to light and milling. This body appears to be the same product as that obtained by sulphonation of 1-amino-2-methoxy-4-p-toluido-anthraquinone such sulphonation being described in our co-pending application Serial No. 384,795 of even date herewith.

Example 4

10 parts of 1-amino-4-toluidoanthraquinone-2:8-disulphonic acid are refluxed for six hours with 80 parts of methyl alcohol and 35 parts of caustic soda liquor 78° Tw. The product is filtered off and dried.

Example 5.—1-amino-4-methylamino-2-methoxyanthraquinone 10 parts of 1-amino-4-methylaminoanthraquinone-2-sulphonic acid are refluxed with 200 parts of methyl alcohol and 60 parts of caustic liquor 70° Tw. On filtering and washing, the base is obtained in the form of blue black crystals giving a red solution in sulphuric acid changing to violet on addition of formaldehyde. The product dyes acetate rayon in violet shades.

Example 6.—1-amino-2-ethoxy-4-toluidoanthraquinone 10 parts of 1-amino-4-p-toluidoanthraquinone-2-sulphonic acid are boiled for 1 hour with 80 parts of ethyl alcohol and 5 parts of caustic soda. The resultant purple crystals of 1-amino-2-ethoxy-4-p-toluidoanthraquinone are filtered off, washed with hot water and dried. The solution in sulphuric acid is red becoming fluorescent on addition of boric acid and changing to blue on addition of formaldehyde.

Example 7.—1-amino-4-toluidoanthraquinone-2-butyl ether 10 parts of 1-amino-4-p-toluidoanthraquinone-2-sulphonic acid are stirred at 116° C. for ½ hour with 100 parts of normal butyl alcohol and 10 parts of caustic soda. The amino toluido-anthraquinonebutyl ether is obtained in the form of violet crystals which are filtered off, washed and dried.

The corresponding anilino derivative is obtained in a similar manner from 1-amino-4-anilinoanthraquinone-2-sulphonic acid. Both these new bases give red colorations in sulphuric acid changing to blue on addition of formaldehyde.

Example 8.—1:4-diaminoanthraquinone-2-butyl ether 10 parts of 1:4-diaminoanthraquinone-2-sulphonic acid are boiled under reflux with 60 parts of normal butyl alcohol and 30 parts of caustic soda liquor 78° C. The diaminoanthraquinone butyl ether is filtered off and washed free from any unchanged sulphonic acid by means of hot water. It forms red crystals which dissolve in sulphuric acid with an orange colour changing to pink on addition of boric acid and to violet on addition of formaldehyde. It dyes acetate rayon red. In all the foregoing examples a corresponding quantity of caustic potash lye may be used in place of caustic soda lye.

What we claim and desire to secure by Letters Patent is:—

1. In the manufacture of 2-alkoxy derivatives of 1:4-diaminoanthraquinones having the probable formula

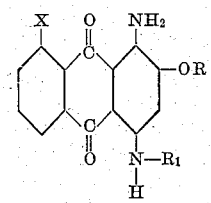

wherein R represents an alkyl group, $R_1$ represents hydrogen, alkyl group or aryl group, and X represents hydrogen or a sulphonic acid group, the process which comprises reacting a 1:4-diaminoanthraquinone having in the form of the free acid the probable general formula

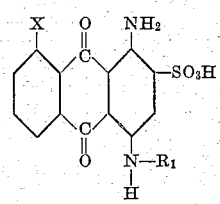

wherein $R_1$ represents hydrogen, alkyl group or aryl group, and X represents hydrogen or a sulphonic acid group, with an alkali metal alkoxide.

2. In the manufacture of 2-alkoxy derivatives of 1:4-diaminoanthraquinones having the probable formula

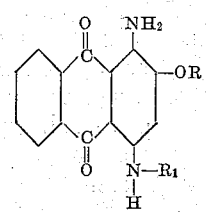

wherein R is an alkyl radical and $R_1$ is hydrogen, an alkyl group or aryl group, the process which comprises reacting a 1:4-diaminoanthraquinone having in the form of the free acid the probable general formula

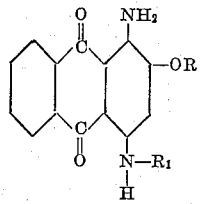

wherein R is an alkyl group and $R_1$ is hydrogen, alkyl group or aryl group, with alkali metal alkoxide.

3. In the manufacture of 2-alkoxy derivatives of 1:4-diaminoanthraquinones having the probable formula

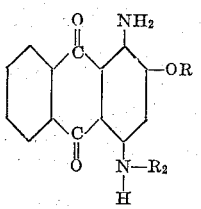

wherein R and $R_2$ represents alkyl groups, the process which comprises reacting a 1:4-diaminoanthraquinone having in the form of the free acid the probable general formula

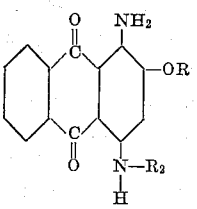

wherein R and $R_2$ represent alkyl groups, with an alkali metal alkoxide.

4. In the manufacture of 2-alkoxy derivatives of 1:4-diaminoanthraquinones having the probable formula

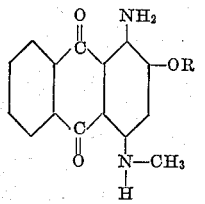

wherein R represents an alkyl group, the process which comprises reacting a 1:4-diaminoanthraquinone having in the form of the free acid the probable formula

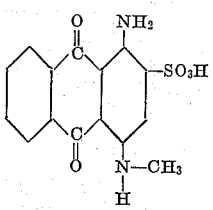

with an alkali metal alkoxide.

5. In the manufacture of the 2-methoxy derivative of 1:4-diaminoanthraquinone having the probable formula

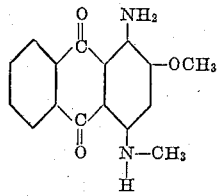

the process which comprises reacting 1:4-diaminoanthraquinone having in the form of the free acid the probable general formula

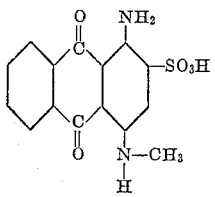

with sodium methoxide.

6. In the manufacture of 2-alkoxy derivative of 1:4-diaminoanthraquinone having the probable formula

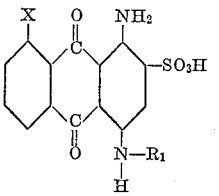

wherein R represents an alkyl group, $R_1$ represents hydrogen, methyl or a benzene residue which may be further substituted with alkyl groups or a sulphonic acid group or both, and X represents hydrogen or a sulphonic acid group, the process which comprises reacting a 1:4-diaminoanthraquinone having in the form of the free acid the probable general formula

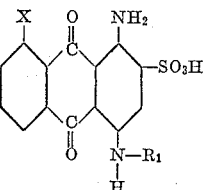
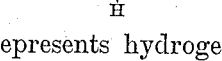

wherein $R_1$ represents hydrogen, a methyl group or a benzene residue which may be further substituted with alkyl groups or a sulphonic acid group or both and X represents hydrogen or a sulphonic acid group, with a solution comprising an aliphatic alcohol and an alkali metal hydroxide.

7. In the manufacture of 2-alkoxy derivative of 1:4-diaminoanthraquinones having the probable formula

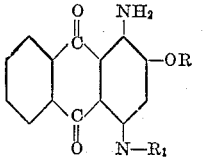

wherein R represents an alkyl group and R₁ represents hydrogen, methyl or a benzene residue which may be further substituted with alkyl groups or a sulphonic acid group or both, the process which comprises reacting a 1:4-diaminoanthraquinone having in the form of the free acid the probable general formula

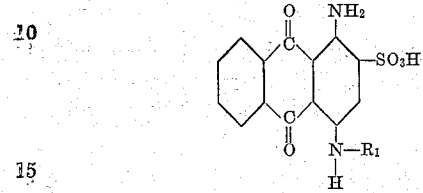

wherein R₁ represents hydrogen, a methyl group or a benzene residue which may be further substituted with alkyl groups or a sulphonic acid group or both, with an alkali metal alkoxide.

8. In the manufacture of 2-alkoxy derivative of 1:4-diaminoanthraquinones having the probable formula

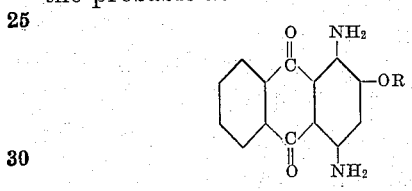

wherein R represents an alkyl group, the process which comprises reacting a 1:4-diaminoanthraquinone having in the form of the free acid the probable formula

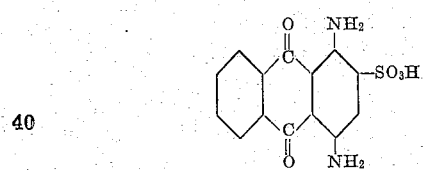

with an alkali metal alkoxide.

9. In the manufacture of 2-methoxy derivative of 1:4-diaminoanthraquinones having the probable formula

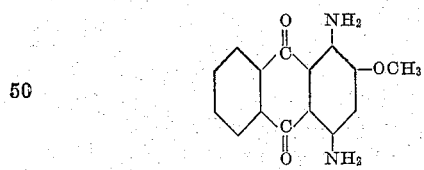

the process which comprises reacting a 1:4-diaminoanthraquinone having in the form of the free acid the probable formula

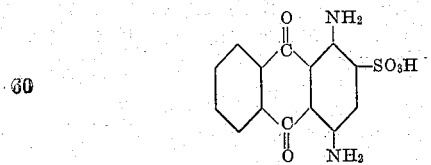

with sodium methoxide.

10. In the manufacture of 2-alkoxy derivative of 1:4-diaminoanthraquinones having the probable formula

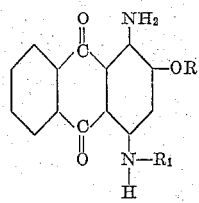

wherein R is an alkyl radical and R₁ is a benzene residue which may be further substituted with akyl groups, the process which comprises reacting a 1:4-diaminoanthraquinone having in the form of the free acid the probable general formula

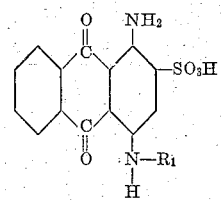

wherein R₁ is a benzene residue which may be further substituted with alkyl groups, with an alkali metal alkoxide.

11. In the manufacture of 2-alkoxy derivative of 1:4-diaminoanthraquinones having the probable formula

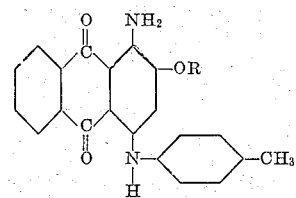

wherein R represents an alkyl group, the process which comprises reacting a 1:4-diaminoanthraquinone having in the form of the free acid the probable formula

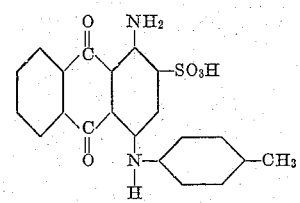

with sodium alkoxide.

12. In the manufacture of 2-methoxy derivative of 1:4-diaminoanthraquinone having the probable formula

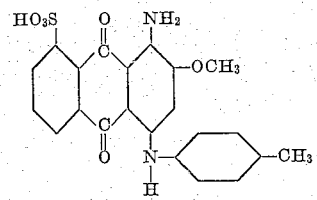

the process which comprises reacting a 1:4- diaminoanthraquinone having in the form of the free acid the probable formula

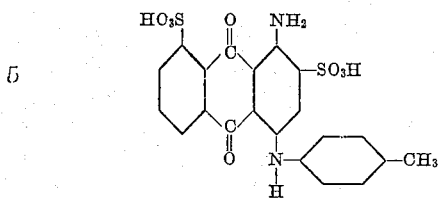

with sodium methoxide.

13. In the manufacture of 2-alkoxy derivative of 1:4-diaminoanthraquinones having the probable formula

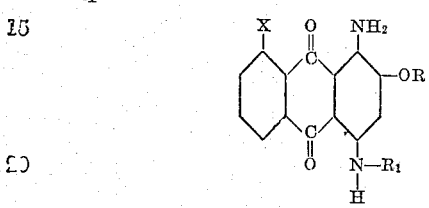

wherein R represents an alkyl group, $R_1$ represents a benzene residue containing a sulphonic acid group and X represents hydrogen or a sulphonic acid group, the process which comprises reacting a 1:4-diaminoanthraquinone having in the form of the free acid the probable general formula

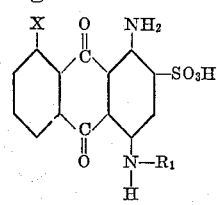

wherein $R_1$ represents a benzene residue containing a sulphonic acid group and X represents hydrogen or a sulphonic acid group, with an alkali metal alkoxide.

14. In the manufacture of 2-methoxy derivative of 1:4-diaminoanthraquinones having the probable formula

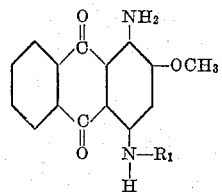

wherein $R_1$ represents a benzene residue containing a soulphonic group, the process which comprises reacting a 1:4-diaminoanthraquinone having in the form of the free acid the probable general formula

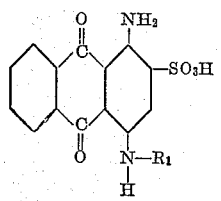

wherein $R_1$ represents a benzene residue containing a sulphonic acid group, with sodium methoxide.

15. In the manufacture of 2-methoxy derivative of 1:4-diaminoanthraquinones having the probable formula

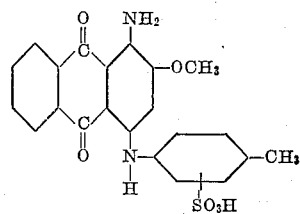

the process which comprises reacting a 1:4-diaminoanthraquinone having in the form of the free acid the probable formula

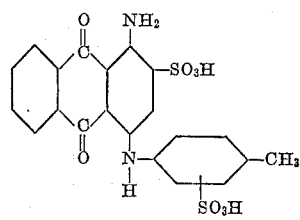

with sodium methoxide.

16. As new dyes the 2-alkoxy derivative of 1:4-diaminoanthraquinones having the probable formula

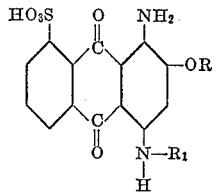

wherein R represents an alkyl radical, $R_1$ represents a benzene residue which may be further substituted with alkyl groups or a sulphonic acid group or both, said dyes being obtainable by reacting a 1:4-diaminoanthraquinone having the probable formula

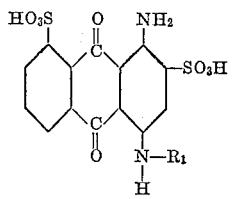

wherein $R_1$ represents a benzene residue which may be further substituted with alkyl groups or a sulphonic acid group or both, with an alkali metal alkoxide.

17. As new dyes, the 2-methoxy derivative of 1:4-diaminoanthraquinones having the probable formula

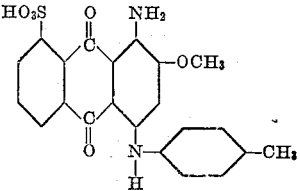

the said dyes being obtainable by reacting the

1:4-diaminoanthraquinone having the probable formula
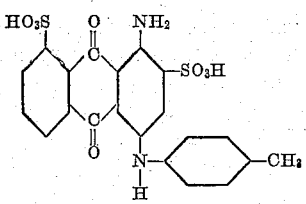
with sodium methoxide.
In testimony whereof we affix our signatures.
FRANK LODGE.
WILLIAM WYNDHAM TATUM.